(12) United States Patent
Ookuma

(10) Patent No.: US 8,867,068 B2
(45) Date of Patent: Oct. 21, 2014

(54) INFORMATION PROCESSING APPARATUS THAT OBTAINS CONTENTS FROM WEB SERVER AND DISPLAYS SAME ON DISPLAY UNIT, CONTROL METHOD FOR INFORMATION PROCESSING APPARATUS, AND STORAGE MEDIUM

(75) Inventor: Satoshi Ookuma, Yokohama (JP)

(73) Assignee: Canon Kabushiki Kaisha (JP)

( * ) Notice: Subject to any disclaimer, the term of this patent is extended or adjusted under 35 U.S.C. 154(b) by 111 days.

(21) Appl. No.: 12/947,175

(22) Filed: Nov. 16, 2010

(65) Prior Publication Data

US 2011/0128573 A1    Jun. 2, 2011

(30) Foreign Application Priority Data

Nov. 27, 2009  (JP) ................................ 2009-270304

(51) Int. Cl.
  *G06F 3/12*   (2006.01)
  *H04N 1/00*   (2006.01)
(52) U.S. Cl.
  CPC .... *H04N 1/00464* (2013.01); *H04N 2201/0094* (2013.01)
  USPC ...................................................... 358/1.15
(58) Field of Classification Search
  None
  See application file for complete search history.

(56) References Cited

U.S. PATENT DOCUMENTS

2005/0015370 A1* 1/2005 Stavely et al. ................ 707/6
2006/0143185 A1* 6/2006 Kuroyanagi ................ 707/10
2008/0196085 A1* 8/2008 Nagoya et al. .............. 726/3
2010/0083383 A1* 4/2010 Adler et al. ................ 726/26

FOREIGN PATENT DOCUMENTS

CN     1797407 A     7/2006
CN     1971558 A     5/2007
JP     2008-186065 A     8/2008

OTHER PUBLICATIONS

Chinese office action issued in Chinese counterpart application No. CN201010572609.8, dated Feb. 5, 2013. English translation provided.

* cited by examiner

*Primary Examiner* — Marivelisse Santiago Cordero
*Assistant Examiner* — Mesfin Getaneh
(74) *Attorney, Agent, or Firm* — Rossi, Kimms, McDowell LLP

(57) ABSTRACT

An information processing apparatus that, when contents are obtained from a reliable Web server set in advance, hides an address bar so as to make effective use of a display region of an operation unit in displaying the contents. Contents corresponding to a designated address are obtained from a Web server. The obtained contents are analyzed and displayed on a display unit. The designated address is displayed on the display unit. Obtainment control is provided such that when the designated address is a specific address, obtainment of contents is permitted, and when the designated address is not the specific address, obtainment of contents is inhibited. When contents are displayed while the obtainment control is being carried out, an address is hidden, and when contents are displayed while the obtainment control is not being carried out, an address is displayed.

6 Claims, 8 Drawing Sheets

INFORMATION PROCESSING APPARATUS THAT OBTAINS CONTENTS FROM WEB SERVER AND DISPLAYS SAME ON DISPLAY UNIT, CONTROL METHOD FOR INFORMATION PROCESSING APPARATUS, AND STORAGE MEDIUM

BACKGROUND OF THE INVENTION

1. Field of the Invention

The present invention relates to an information processing apparatus that obtains contents from a Web server and displays the same on a display unit, a control method for the information processing apparatus, and a computer-readable storage medium storing a program for causing a computer to execute the method.

2. Description of the Related Art

In general, an information processing apparatus such as a personal computer (PC) is used in many cases in an environment where it is connected to a Web server via a network. Such an information processing apparatus obtains structured language files in HTML (hypertext markup language) or the like and image data files as contents from the Web server. The information processing apparatus displays, on a display unit, the contents obtained from the Web server using a Web browser incorporated in the information processing apparatus.

The display of such a Web browser has a region where contents obtained from the Web server are displayed. Also, the display of the Web browser has a region where a URL (uniform resource locator) address of a Web server from which contents have been obtained is displayed (an address bar).

On the display of the Web browser, a user can see a URL address displayed in the address bar to know a Web server from which contents being currently displayed on the Web browser have been obtained.

Also, in resent years, there have been some information processing apparatuses such as an MFP having a scanner and a printer (multifunctional peripheral) which are equipped with an incorporated Web browser. In such an MFP, contents from a Web server to which the MFP is connected are displayed on an operation display unit on the MFP.

However, the operation display unit on the MFP has a display screen small in size due to constraints in terms of chassis size and cost reduction.

For this reason, the display unit of the MFP is worse in visibility and appearance of contents as compared to Web browsers of typical PCs. Further, there may be a case where the display unit of the MFP obtains, from a Web server, an operation screen for performing operations relating to functions which the MFP itself has, and displays the same. In this case, the user is notified that the operation screen is a content obtained from the Web server because a URL address is displayed in an address bar. Namely, an address bar is displayed or hidden according to whether an operation screen held in advance in the MFP is displayed or an operation screen obtained from a Web server is displayed, and this may confuse the user.

For this reason, the display unit of the MFP may hide an address bar of a Web browser so as to widen a content display region even if only slightly, or so as to make the user unconscious that contents have been obtained from a Web server.

Moreover, among conventional image processing apparatuses such as a copier and a printer, there have been proposed those which provide control to hide an operating means including an address bar according to an instruction from a Web server. Regarding such image processing apparatuses, it has been proposed that an operation unit for screen transition including an address bar on a Web browser is hidden in response to a specific instruction sent from a Web server as a content obtainment source (see, for example, Japanese Laid-Open Patent Publication (Kokai) No. 2008-186065).

However, in recent years, it has been pointed out that there is a problem of tempering with contents by so-called phishing or the like. For this reason, in the information processing apparatuses, emphasis is placed on displaying a URL address in an address bar so that a user can ascertain whether or not contents being currently displayed on the display unit have been obtained from an authorized Web server.

Further, in the information processing apparatuses, hiding an address bar gives a user a feeling of insecurity because he/she cannot ascertain whether or not contents being currently displayed have been obtained from an authorized Web server. Thus, in the conventional information processing apparatuses, even when contents from a reliable Web server are being displayed, an address bar is always displayed.

For this reason, in the conventional information processing apparatuses, a display region for contents displayed on the display unit is narrowed for display of an address bar, and hence all display items cannot be displayed on one page, which results in degradation of visibility.

Also, some of the conventional information processing apparatuses are able to hide an address bar in accordance with an instruction from a Web server. Such information processing apparatuses have the problem that when a malicious Web server sends an instruction to hide an address bar and poses as an authorized Web server, a user cannot know its URL address.

SUMMARY OF THE INVENTION

The present invention provides an information processing apparatus that, when contents are obtained from a reliable Web server set in advance, hides an address bar so as to make effective use of a display region of an operation unit in displaying the contents, and when contents are obtained from a Web server other than Web servers set in advance, displays a URL address in an address bar, so that a user can know a Web server from which contents being currently displayed have been obtained, as well as a control method for the information processing apparatus, and a computer-readable storage medium storing a program for causing a computer to execute the method.

Accordingly, a first aspect of the present invention provides an information processing apparatus comprising a content obtainment unit configured to, based on a designated address, obtain contents corresponding to the address from a Web server, a content display unit configured to analyze the contents obtained by said content obtainment unit, and display the contents on a display unit, an address display unit configured to display the designated address on the display unit, an obtainment control unit configured to carry out obtainment control to, when the designated address is a specific address, permit said content obtainment unit to obtain contents, and when the designated address is not the specific address, inhibit said content obtainment unit from obtaining contents, and a display control unit configured to, when said content display unit displays contents in a state where said obtainment control unit is carrying out the obtainment control, provide control to inhibit said address display unit from displaying an address, and when said content display unit displays contents in a state where said obtainment control unit is not carrying out the obtainment control, provide control to cause said address display unit to display an address.

Accordingly, a second aspect of the present invention provides a control method for an information processing apparatus, comprising a content obtainment step of, based on a designated address, obtaining contents corresponding to the address from a Web server, a content display step of analyzing the contents obtained in said content obtainment step, and displaying the contents on a display unit, an address display step of displaying the designated address on the display unit, an obtainment control step of carrying out obtainment control to, when the designated address is a specific address, permit obtainment of contents in said content obtainment step, and when the designated address is not the specific address, inhibit obtainment of contents in said content obtainment step, and a display control step of, when contents are displayed in said content display step in a state where the obtainment control is being carried out in said obtainment control step, providing control not to display an address in said address display step, and when contents are displayed in said content display step in a state where the obtainment control is not being carried out in said obtainment control step, providing control to display an address in said address display step.

Accordingly, the third aspect of the present invention provides a non-transitory computer-readable storage medium storing a program for causing a computer to execute the control method for the information processing apparatus described above.

According to the present invention, an address bar is hidden when contents obtained from a reliable Web server set in advance are displayed. This can enhance visibility and appearance of contents, and effective use of a display region of an operation unit can be made to display contents. Further, when contents obtained from a Web server other than Web servers set in advance are displayed, an address bar is displayed on a display screen so that the user can know a URL address of the Web server. As a result, reliability can be enhanced because the user can view only contents obtained from authorized Web servers.

Further features of the present invention will become apparent from the following description of exemplary embodiments (with reference to the attached drawings).

DESCRIPTION OF THE EMBODIMENTS

A description will now be given of an MFP (multifunctional peripheral) equipped with a scanner and a printer according to a first embodiment of an information processing apparatus of the present invention with reference to FIGS. 1 to 6B.

The MFP according to the first embodiment is configured to hide an address bar when displaying contents corresponding to an address obtained from a Web server at a URL address set in advance. Also, the MFP is configured to display an address bar when displaying contents obtained from a Web server other than Web servers set in advance.

Figure 1:
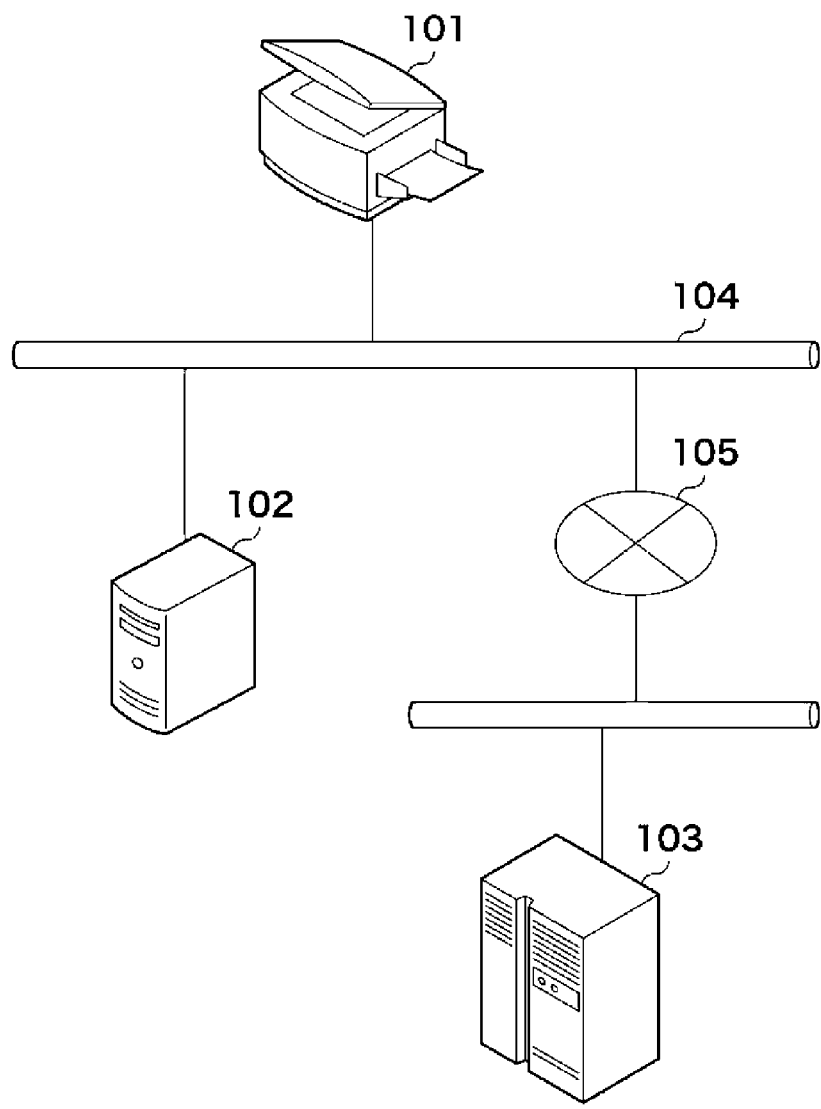
FIG. 1 is a diagram showing an overall arrangement of a information processing system including an MFP equipped with a scanner and a printer according to a first embodiment of an information processing apparatus of the present invention.

Referring to a block diagram of FIG. 1 showing an overall system including the MFP, the MFP 101 and Web servers 102 and 103 are connected together via a network. The network is comprised of a LAN (local area network) 104, the Internet 105, and so on.

The MFP 101 has a copy function of scanning a sheet medium, forming an image on a sheet based on the scanned data, and outputting the image. The MFP 101 is equipped with a Web browser 300 so that it can obtain contents held in the Web servers 102 and 103 and display the same on an operation display unit 211.

Figure 2:
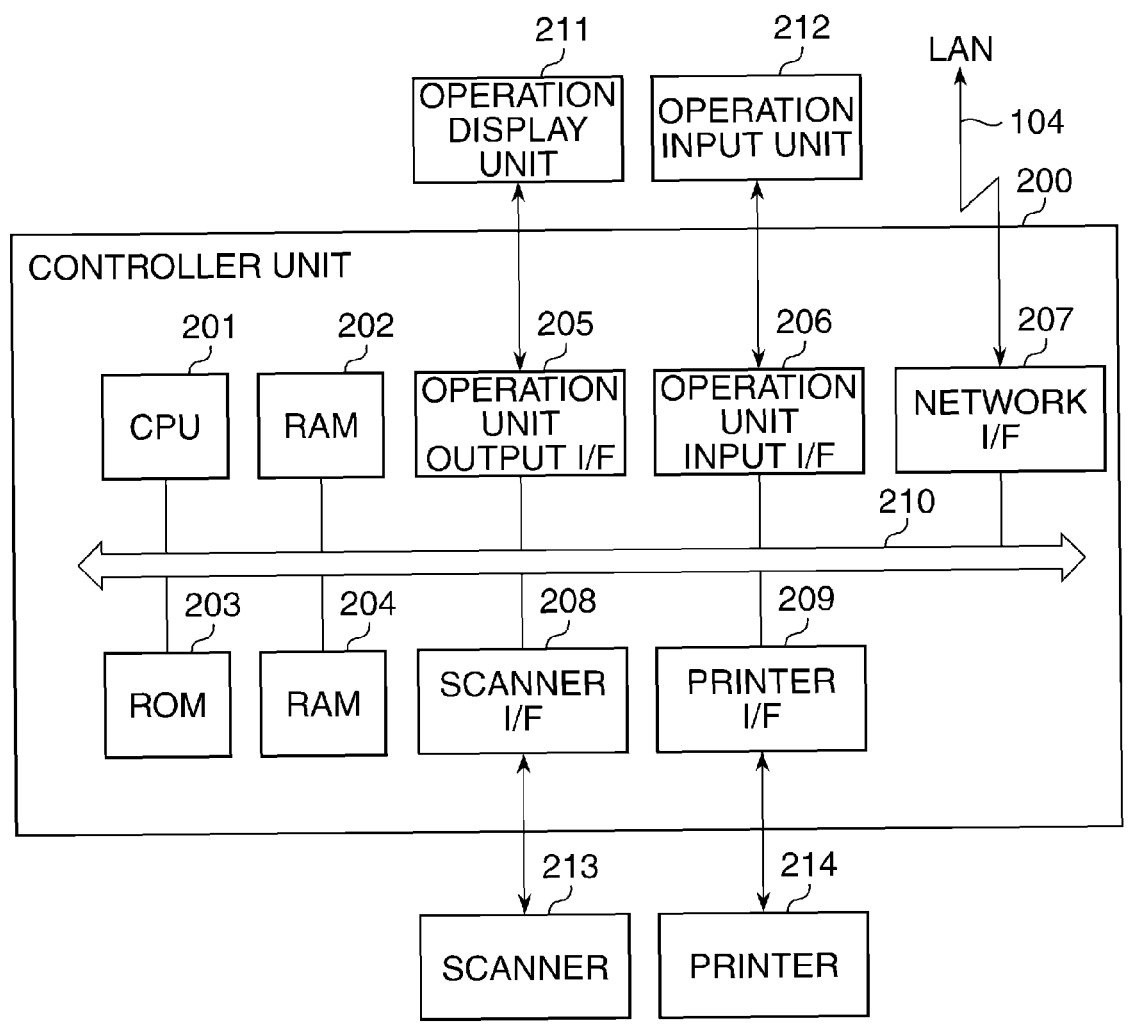
FIG. 2 is a block diagram schematically showing an arrangement of an MFP according to the first embodiment.

Referring next to a block diagram of FIG. 2, a description will be given of an arrangement of the MFP 101. The MFP 101 has a controller unit 200 to which a scanner 213 and a printer 214 are connected, and to which the operation display unit 211, an operation input unit 212, and the LAN 104 can be connected.

The controller unit 200 has a CPU (central processing unit) 201 that is disposed with various devices on a system bus 210 and executes various control programs. The CPU 201 boots the MFP 101 based on a boot program stored in a ROM (read-only memory) 203 via the system bus 210. The CPU 201 reads control programs stored in an HDD (hard disk drive) 204, and carries out predetermined processes using a RAM (random access memory) 202 as a work area.

The HDD 204 stores various control programs including functions of the Web browser 300. In short, the controller unit 200 implements functions and operations of the Web browser 300. Further, the HDD 204 stores scanned data scanned in from the scanner 213, contents data obtained from a Web server outside the apparatus via a network I/F 207, and so on.

An operation unit output I/F 205 disposed on the system bus 210 controls communication to output data to the operation display unit 211. The operation display unit 211 connected to the operation unit output I/F 205 is a display interface for a user. The operation display unit 211 has display devices such as an LCD (liquid crystal display) and an LED (light emitting diode).

An operation unit input I/F 206 disposed on the system bus 210 controls communication to input data from the operation input unit 212. The operation input unit 212 connected to the operation unit input I/F 206 is an interface that has a touch panel and hardware keys and across which the user inputs instructions.

The network I/F 207 disposed on the system bus 210 is connected to the LAN 104, and provides control to input and output information via the LAN 104.

A scanner I/F 208 disposed on the system bus 210 inputs image data from the scanner 213, and inputs and outputs scanner control data. The scanner 213 has an optical reader such as a CCD (charge coupled device), and has a function of optically scanning in a sheet medium as electronic image data.

A printer I/F 209 disposed on the system bus 210 outputs output image data to the printer 214, and inputs and outputs printer control data. The printer 214 has a function of forming electronic image data as an image on a recording medium such as a sheet.

Figure 3:
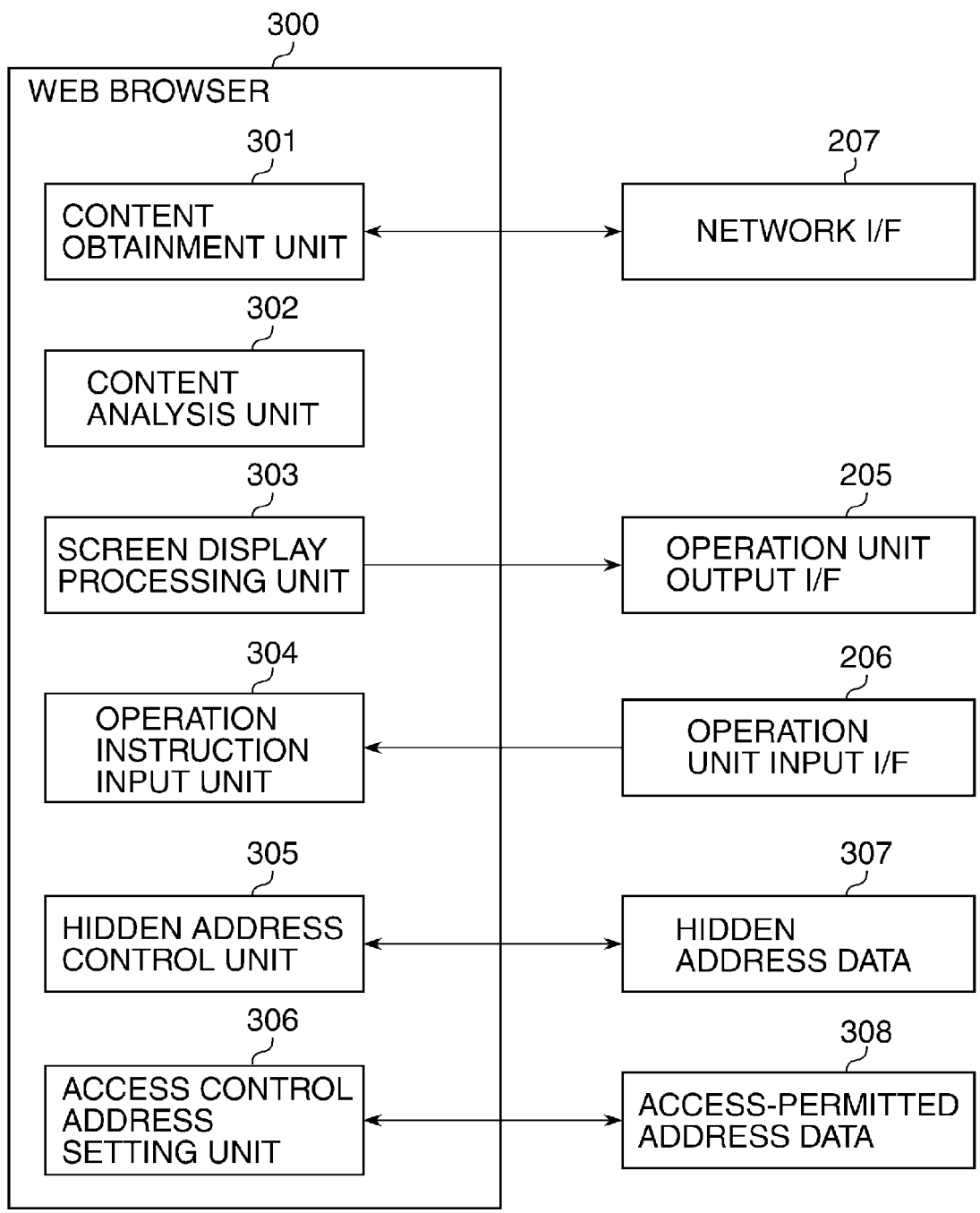
FIG. 3 is a block diagram schematically showing a software arrangement of a Web browser installed in the MFP according to the first embodiment.

Referring next to FIG. 3, a description will be given of a software arrangement of the Web browser incorporated in the MFP 101.

The Web browser 300 shown in FIG. 3 is implemented by the CPU 201 included in the controller unit 200 of the information processing apparatus 101 reading out and executing a control program stored in the ROM 203 or the HDD 204.

A content obtainment unit 301 incorporated in the Web browser 300 has a function of carrying out communication with a Web server outside the apparatus via the network I/F 207. More specifically, the content obtainment unit 301 requests contents from a Web server in response to an instruction from the user, and receives contents sent from the Web server based on the request.

A content analysis unit 302 of the Web browser 300 analyzes contents obtained by the content obtainment unit 301, and forms a screen to be displayed on the operation display unit 211. Namely, the Web browser 300 has an address drawing unit that creates a screen for displaying, on the operation display unit 211, an address of a Web server from which contents have been obtained. Contents obtained from a Web server are formed mainly of a structured language file in HTML or the like and an image data file, and describe contents of an operation screen to be displayed on the operation display unit 211.

A screen display processing unit 303 of the Web browser 300 instructs the operation unit output I/F 205 to display a display screen analyzed and formed by the content analysis unit 302 on the operation display unit 211. Namely, the Web browser 300 has a content drawing unit that analyzes contents obtained by the content obtainment unit 301 and creates a screen to be displayed on the operation display unit 211.

Thus, contents obtained from a Web server are displayed on the operation display unit 211. Also, the screen display processing unit 303 instructs the operation display unit 211 to display a setting screen for making various settings for the Web browser 300.

An operation instruction input unit 304 of the Web browser 300 receives instructions input by the user via the operation unit input I/F 206. Examples of the instructions received by the operation instruction input unit 304 include an instruction to input and set a URL address (address information), an instruction to access a link included in the content display screen displayed on the operation display unit 211, and an instruction to make settings on the setting screen of the Web browser 300.

A hidden address control unit 305 of the Web browser 300 receives an instruction to register a URL address (address information) of a Web server for which an address bar is to be hidden, the instruction input by the user. The hidden address control unit 305 stores as hidden address data 307, in the RAM 202 or the HDD 204, an instruction to register a URL address (address information) of a Web server for which an address bar is to be hidden. Also, the hidden address control unit 305 reads out the stored hidden address data 307 from the RAM 202 or the HDD 204 as necessary. Namely, the web browser 300 has a hidden address information obtainment unit that obtains address information on a content obtainment source of which address is to be hidden on the operation display unit 211.

Further, an access control address setting unit 306 receives an instruction to register a URL address of a Web server permitted to be accessed, the instruction input by the user. The access control address setting unit 306 stores as access-permitted address data 308, in the RAM 202 or the HDD 204, information on a URL address of a Web server permitted to be accessed.

In short, the web browser 300 has an obtainable address information storage unit that stores address information on a Web server from which obtainment of contents is permitted.

Also, the access control address setting unit 306 reads out the stored access-permitted address data 308 from the RAM 202 or the HDD 204 as necessary.

Figure 4A:
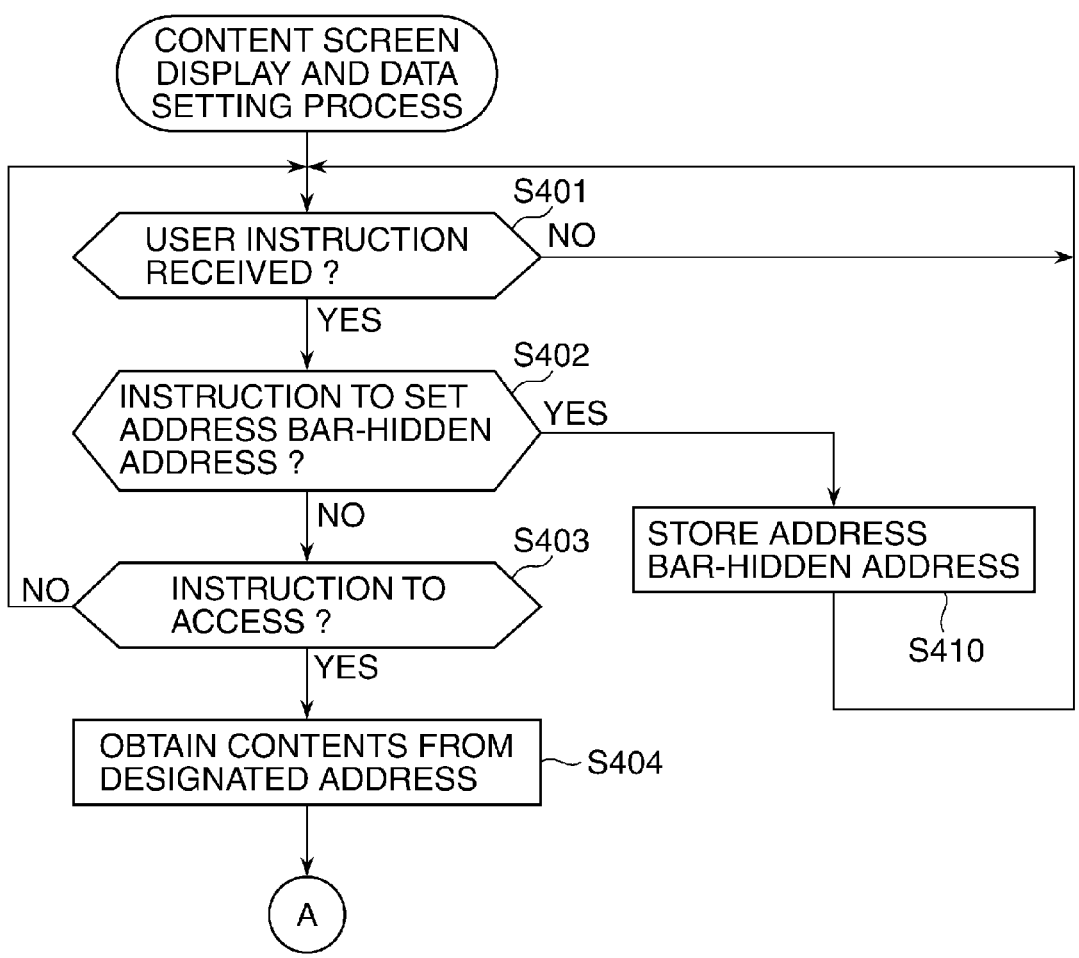
FIGS. 4A and 4B are flowcharts showing procedures of a sequential process in which the MFP according to the first embodiment of the information processing apparatus displays a content screen and sets data in the Web browser in accordance with an instruction from a user.
Figure 4B:
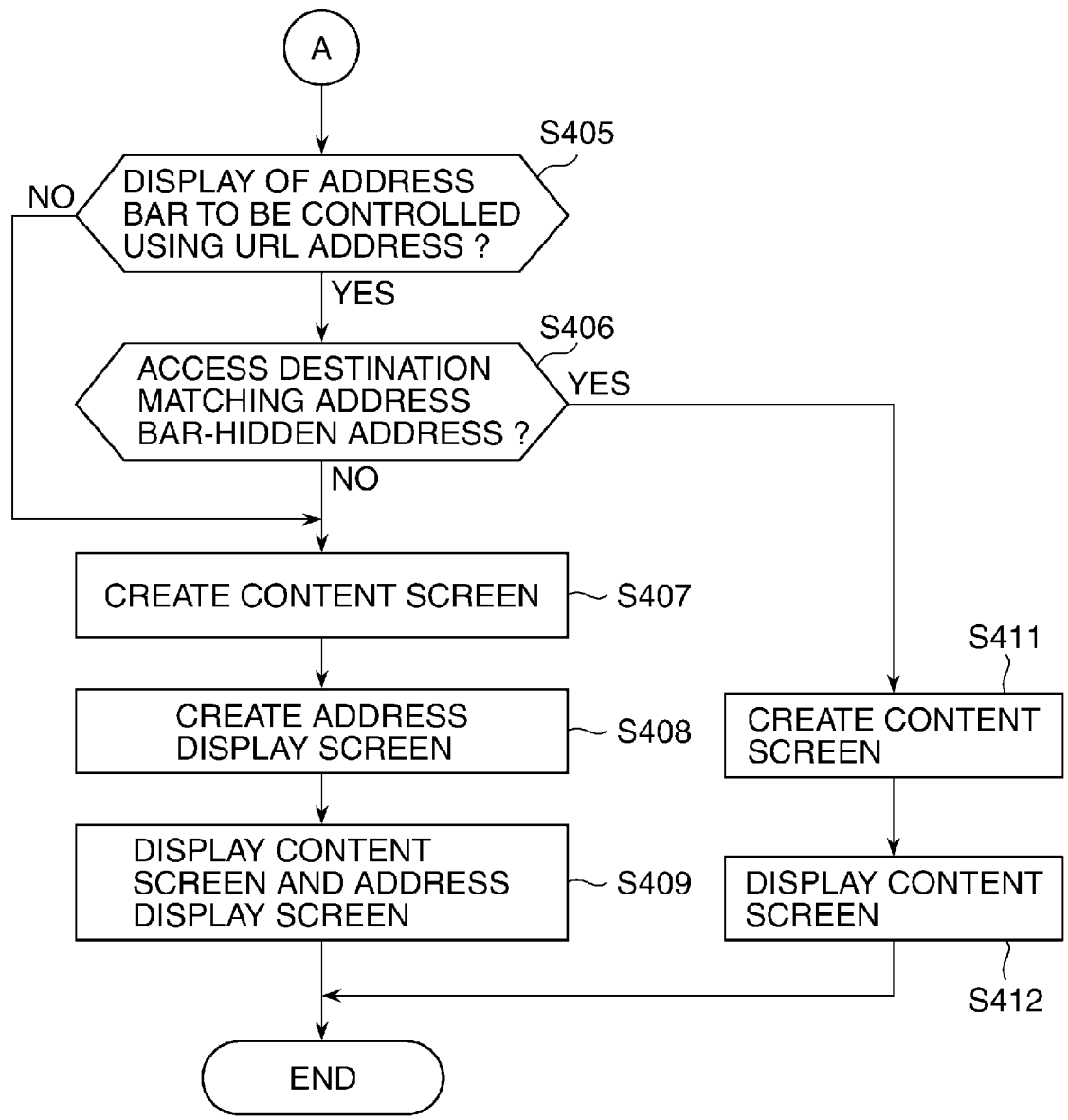

Referring next to flowcharts of FIGS. 4A and 4B, a description will be given of a sequential process in which the MFP 101 receives an instruction from the user, and displays a content screen and sets data in the Web browser in accordance with the instruction. Processes in the flowcharts of FIGS. 4A and 4B are implemented by the CPU 201 of the MFP 101 reading out and executing control programs stored in the ROM 203 or the HDD 204.

In this content screen display and data setting process, the web browser 300 stands by until it receives an operation instruction from the user (NO in step S401).

Then, when the operation instruction input unit 304 receives an instruction to perform various operations on the Web browser 300 from the user via the operation unit input I/F 206 (YES in the step S401), the process proceeds to the next step S402.

In the step S402, the Web browser 300 makes a determination about the operation instruction input by the user via the operation instruction input unit 304. Here, the Web browser 300 determines whether or not the operation instruction input by the user is an instruction to set and register an address bar-hidden address.

FIGS. 5A to 5D show exemplary operation screens displayed on the operation display unit 211 by the Web browser 300. The operation screens are displayed on the operation display unit 211 by the screen display processing unit 303 of the Web browser 300 via the operation unit output I/F 205.

Figure 5A:
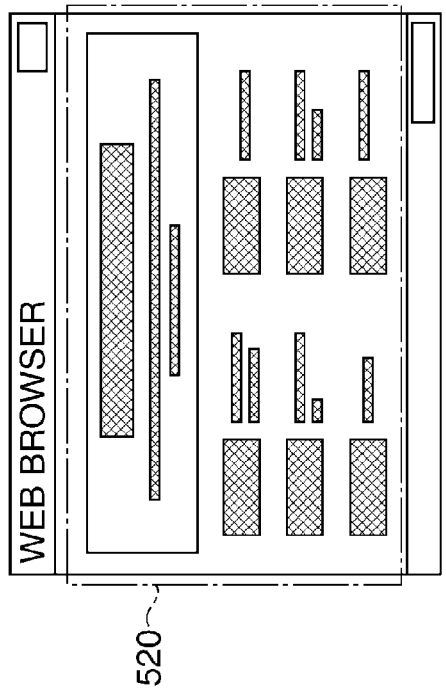
FIGS. 5A to 5D are views useful in explaining respective exemplary screens displayed on an operation display unit by the Web browser of the MFP equipped with the scanner and the printer according to the information processing apparatus of the present invention.

The Web browser 300 displays, on the operation display unit 211, a setting screen for setting an address bar-hidden address as shown in FIG. 5A.

Here, the address bar-hidden address means a URL address for which an address bar is to be hidden on the operation display unit 211 by the Web browser 300. When the address bar-hidden address matches a URL address of a Web server from which contents have been obtained, the Web browser 300 provides control to hide an address bar on the operation display unit 211.

In setting the address bar-hidden address, a URL address of a reliable Web server, of which URL address does not have to be checked by the user, is usually set.

In short, the Web browser 300 obtains contents only when an address of a Web server from which contents are to be obtained by the content obtainment unit matches address information in the obtainable address information storage unit. The Web browser 300 has an obtainment control unit (access control unit) that controls the content obtainment unit in the above-mentioned manner.

Also, when the above setting is made, it may be arranged such that an address bar is hidden only when contents obtained from a reliable Web server of which URL address (address information) is registered in advance are being displayed. When an address bar is hidden on the operation display unit 211, a part of its display region is not occupied by an address bar being displayed, and hence effective use of the entire display region can be made to display contents.

On an address bar hidden-address setting dialogue 500 shown in FIG. 5A, an address bar hiding setting switch 501 and an address bar-hidden address setting edit box 502 are displayed.

The address bar hiding setting switch 501 is a switch for setting whether or not to carry out an address bar hiding process by comparing URL addresses in a case where an address bar-hidden address is set.

In short, the Web browser 300 has a hidden address setting unit that stores, in a hidden address information storage unit, an address of a content obtainment source of which address is to be hidden on the operation display unit 211 and which has been input by the user via the operation input unit.

When the address bar hiding setting switch 501 is enabled, the Web browser 300 compares a registered URL address of the hidden address data 307 and a URL address of a Web server from which contents have been obtained. When, as a result of the comparison, they match each other, the Web browser 300 carries out a process to hide an address bar.

The address bar hidden-address setting edit box 502 shown in FIG. 5A is an edit region for designating a URL address of a Web server as a content obtainment source for which an address bar is to be hidden. In the address bar hidden-address setting edit box 502, a plurality of URL addresses of Web servers can be designated.

When a plurality of URL addresses are set, the Web browser 300 determines whether or not a URL address of a Web server from contents are to be obtained matches any URL address of the address bar-hidden addresses.

Then, when the obtained URL address of the Web server matches any of the designated address bar-hidden addresses, contents are displayed with an address bar being hidden.

An address bar hidden-address setting OK button 503 shown in FIG. 5A is a button for confirming items set by the user in the address bar-hidden address setting dialogue 500.

Next, in the step S402 in the flowchart of FIG. 4A, the Web browser 300 determines whether or not the operation instruction input by the user is an instruction to depress the address bar-hidden address setting OK button 503.

Then, when the Web browser 300 determines that the operation instruction input by the user is an instruction to depress the address bar-hidden address setting OK button 503 (YES in the step S402), the process proceeds to the next step S410.

In the step S410, the hidden address control unit 305 stores the hidden address data 307 in the RAM 202 or the HDD 204 according to a user's instruction to register the address bar hidden-address setting, and then the process returns to the step S401. The hidden address data 307 includes the value of the address bar hiding setting switch 501 and the data on the URL address in the address bar-hidden address setting edit box 502.

Also, in the step S402, when the Web browser 300 determines that the operation instruction input by the user is not an instruction to register the address bar-hidden address setting (NO in the step S402), the process proceeds to step S403.

In the step S403, the Web browser 300 determines whether or not the operation instruction input by the user is an instruction to access a URL address. Here, an instruction to access a URL address includes an instruction to access a link in the contents displayed on the operation display unit 211 and an instruction to access a Web server of which URL address is directly input by the user.

When the Web browser 300 determines that the operation instruction input by the user is not an instruction to access a URL address (NO in the step S403), the process returns to the step S401.

When the Web browser 300 determines that the operation instruction input by the user is an instruction to access a URL address (YES in the step S403), the process proceeds to step S404. In the step S404, the content obtainment unit 301 obtains contents from the Web server at the URL address to which access is instructed by the user.

Then, the process proceeds to step S405, in which the Web browser 300 determines whether or not the value of the address bar hidden address setting switch 501 is valid based on the value of the hidden address data 307 stored in the step S410. Namely, the Web browser 300 determines whether or not it is configured such that an address bar is to be hidden by performing a comparison with the URL address of the Web server from which the contents have been obtained.

When the Web browser 300 determines that the value of the address bar hidden address setting switch 501 is invalid (NO in the step S405), the process proceeds to step S407, described later.

When the Web browser 300 determines that the value of the address bar hidden address setting switch 501 is valid (YES in the step S405), the process proceeds to step S406.

In the step S406, the Web browser 300 determines whether or not the URL address of the Web server from which the contents have been obtained matches a URL address in the hidden address data 307.

When the Web browser 300 determines that the URL address of the Web server from which the contents have been obtained does not match a URL address in the hidden address data 307 (NO in the step S406), the process proceeds to the step S407.

In the step S407, the Web browser 300 instructs the content analysis unit 302 to analyze the contents obtained from the Web server and create a content display screen. Further, the Web browser 300 instructs the screen display processing unit 303 to display, on the operation display unit 211, the content display screen data created by the content analysis unit 302.

Then, in step S408, the Web browser 300 forms an address bar display screen showing the URL address of the Web server from which the contents were obtained in the step S404. Further, the Web browser 300 instructs the screen display processing unit 303 to display the address bar display screen. In short, the Web browser 300 has a display unit that obtains screens from the content drawing unit and the address drawing unit and displays the same on the operation unit.

Thereafter, in step S409, the screen display processing unit 303 displays the designated content display screen and address bar display screen on the operation display unit 211 via the operation unit output I/F 205.

Figure 5C:
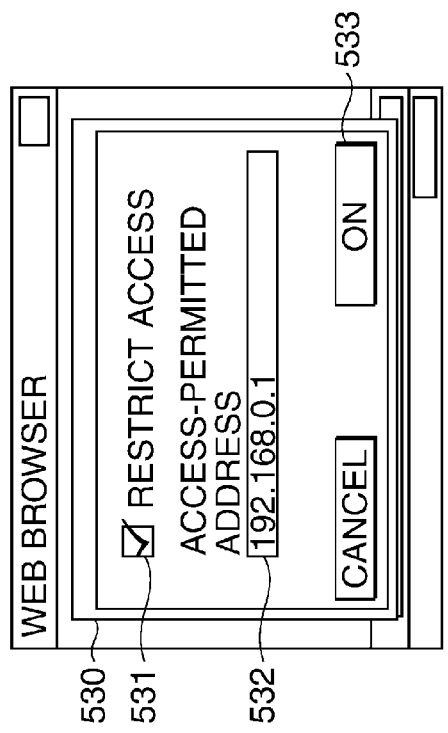
Figure 5B:
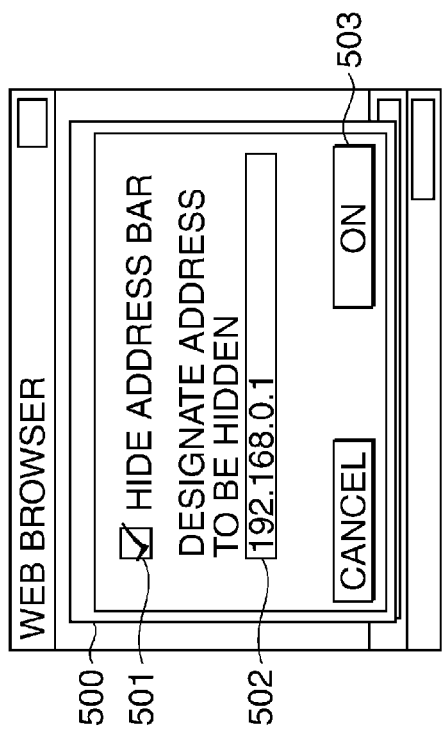

Here, the Web browser 300 displays a Web browser screen as shown in FIG. 5B on the operation display unit 211. On this Web browser screen, a content display region 510 and an address bar display region 511 are displayed on the operation display unit 211.

In the content display region 510, the content display screen created in the step S407 is displayed. Also, in the address bar display region 511, the address bar display screen created in the step S408 is displayed.

In this display, the URL address of the Web server from which the contents being currently displayed in the content display region 510 have been obtained is displayed in the address bar display region 511. Thus, the user can know which Web server provides the contents he/she is viewing and gains a sense of security. It should be noted that the content display region 510 is narrowed for the address bar display screen.

Then, when the Web browser 300 determines that the URL address of the Web server from which the contents have been obtained matches a URL address in the hidden address data 307 (YES in the step S406), the process proceeds to step S411.

In the step S411, the Web browser 300 instructs the content analysis unit 302 to analyze the contents obtained from the Web server and create a content display screen. At this time, the Web browser 300 instructs to create an enlarged content display screen, assuming that the address bar display region 511 is not displayed. Further, the Web browser 300 instructs the screen display processing unit 303 to display, on the operation display unit 211, the content display screen data created by the content analysis unit 302.

Then, the process proceeds to step S412, in which the screen display processing unit 303 displays the designated content display screen on the operation display unit 211 via the operation unit output I/F 205.

Here, the Web browser 300 displays a Web browser screen as shown in FIG. 5C on the operation display unit 211. On this Web browser screen, only the content display screen is displayed in a content display region 520, and an address bar is not displayed on the screen of the operation display unit 211.

In short, the Web browser 300 has an address display control unit that compares address information on a Web server from which contents have been obtained by the content obtainment unit with address information obtained by the hidden address information obtainment unit, and then, when the address of the content obtainment source matches the hidden address information, provides control so as to hide a screen created by the address drawing unit on the display unit.

Thus, the content display region 520 can be widely displayed on the operation display unit 211, and visibility and operability in content display can be enhanced. For example, contents can be displayed over the entire screen of the operation display unit 211, and hence displayed contents can be glanced at because part of the contents is not hidden.

Moreover, by the sequential process in FIGS. 4A and 4B, an address bar can be hidden only when contents obtained from a Web server of which URL address matches a URL address registered in advance by the user are displayed. Therefore, the MFP according to the first embodiment gives the user a sense of security arising from viewing contents obtained from his/her intended Web browser even when an address bar is not displayed.

Referring next to flowcharts of FIGS. 6A and 6B, a description will be given of a second embodiment of the present invention.

In the second embodiment, an address bar is hidden only in a case where the MFP which is an exemplary information processing apparatus of the present invention restricts access such that access to only Web servers registered in advance is permitted. It is arranged such that an address bar is displayed in other cases. It should be noted that the second embodiment is similar in system arrangement, etc. to the first embodiment described above, and therefore, description of common features is omitted, only features differing those of the first embodiment being described below.

Figure 6A:
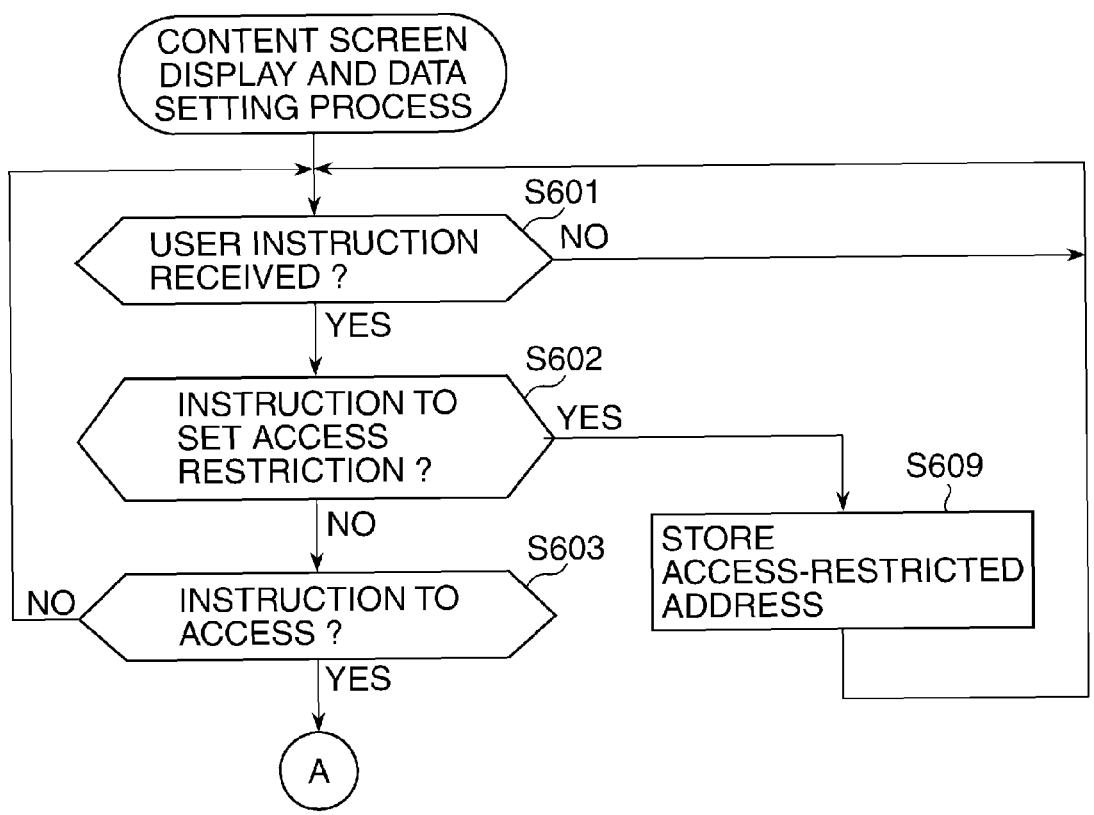
FIGS. 6A and 6B are flowcharts showing procedures of a sequential process in which the MFP according to a second embodiment of the present invention displays a content screen on the Web browser and sets data in a Web browser in accordance with an instruction from a user.
Figure 6B:
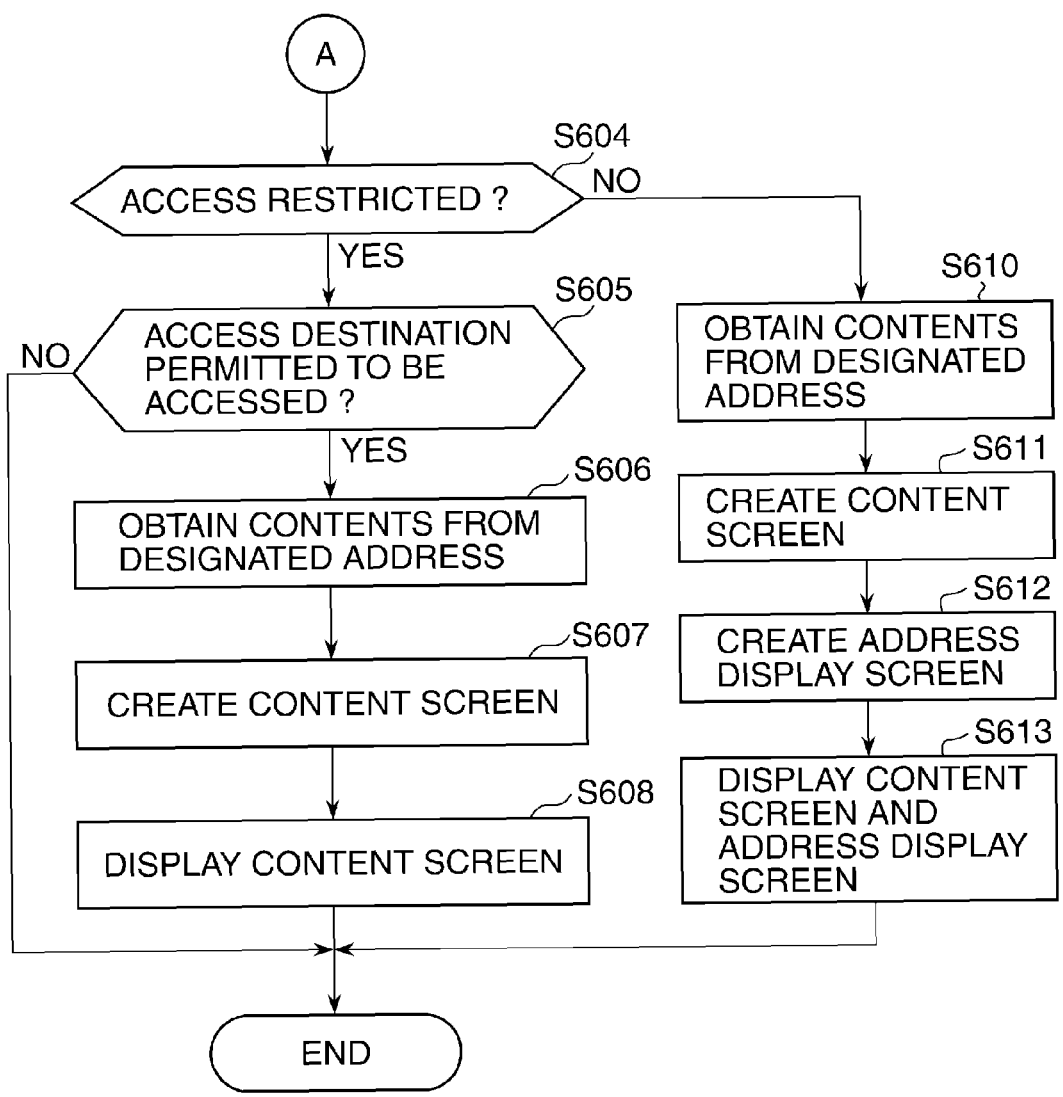

Processes in the flowcharts of FIGS. 6A and 6B are implemented by the CPU 201 of the MFP 101 reading out and executing control programs stored in the ROM 203 or the HDD 204.

In this content screen display and data setting process, the web browser 300 stands by until it receives an operation instruction from the user (NO in step S601).

Then, when the operation instruction input unit 304 receives an instruction to perform various operations on the Web browser 300 from the user via the operation unit input I/F 206 (YES in the step S601), the process proceeds to the next step S602.

In the step S602, the Web browser 300 makes a determination about the operation instruction input by the user via the operation instruction input unit 304. Here, the Web browser 300 determines whether or not the operation instruction input by the user is an instruction to set access restriction that makes only contents from Web servers registered in advance viewable.

Figure 5D:
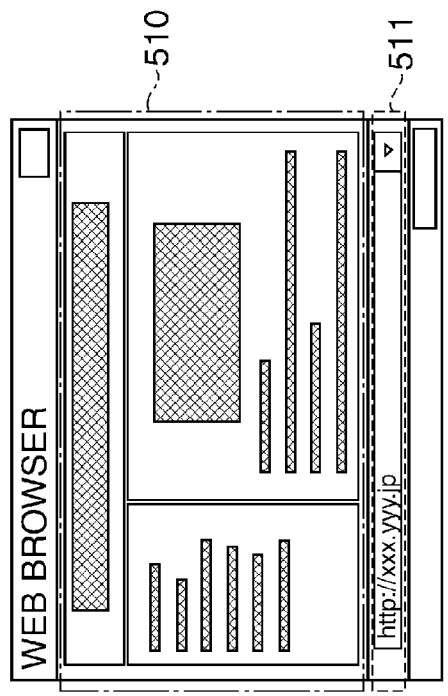

An exemplary setting screen for setting an access restriction setting address which is displayed on the operation display unit 211 by the Web browser 300 is shown in FIG. 5D. The access restriction setting address means an address of a Web server to which access is permitted by the Web browser 300 only when the access restriction setting address matches a URL address of a Web server from which contents are to be obtained.

When the access restriction setting address does not match a URL address of a Web server from which contents are to be obtained, access to the Web server itself is prohibited. In general, a URL address of a reliable Web server is designated as the access restriction setting address.

On an access restriction setting address setting dialogue 530 shown in FIG. 5D, an access restriction setting switch 531 and an access-permitted address setting edit box 532 are displayed. The access restriction setting switch 531 is a switch for setting whether or not to restrict access to a Web server as a result of comparison with a registered URL address. With the access restriction setting switch 531 enabled, the Web browser 300 controls obtainment to access only a Web server of which URL address matches a registered URL address.

The access-permitted address setting edit box 532 shown in FIG. 5D is an edit region for designating a URL address of a Web server as a content obtainment source permitted to be accessed when contents are to be obtained. In the access-permitted address setting edit box 532, a plurality of URL addresses of Web servers can be designated.

An access restriction setting OK button 533 shown in FIG. 5D is a button for confirming items set by the user in the access restriction setting address setting dialogue 530.

Next, in the step S602 in the flowchart of FIG. 6A, the Web browser 300 determines whether or not the operation instruction input by the user is an instruction to depress the access restriction setting OK button 533.

Then, when the Web browser 300 determines on the access restriction setting address setting dialogue 530 that the operation instruction input by the user is an instruction to depress the access restriction setting OK button 533, the process proceeds to step S609.

In the step S609, the access control address setting unit 306 stores access-permitted address data 308 in the RAM 202 or the HDD 204 according to a user's instruction to register the access restriction setting, and then the process returns to the step S601. The access-permitted address data 308 includes the value of the access restriction setting switch 531 and the data on the URL address in the access-permitted address setting edit box 532.

Also, in the step S602, when the Web browser 300 determines that the operation instruction input by the user is not an instruction to depress the access restriction setting OK button 533 (NO in the step S602), the process proceeds to step S603.

In the step S603, the Web browser 300 determines whether or not the operation instruction input by the user is an instruction to access a URL address. When the Web browser 300 determines that the operation instruction input by the user is not an instruction to access a URL address (NO in the step S603), the process returns to the step S601.

When the Web browser 300 determines that the operation instruction input by the user is an instruction to access a URL address (YES in the step S603), the process proceeds to step S604.

In the step S604, the Web browser 300 determines whether or not the value of the access restriction setting switch 531 is valid. When the Web browser 300 determines that the value of the access restriction setting switch 531 of the access-permitted address data 308 is invalid (NO in the step S604), that is, access restriction using a URL address is not imposed on a Web server, the process proceeds to step S610.

In the step S610, the content obtainment unit 301 obtains contents from the Web server at the URL address to which access is instructed by the user.

Next, in processes from steps S611 to S1613, first, the Web browser 300 instructs the content analysis unit 302 to analyze the contents obtained in the step S610 and create a content display screen. Then, the Web browser 300 instructs the screen display processing unit 303 to display the content display screen created by the content analysis unit 302. Then, the Web browser 300 instructs the screen display processing unit 303 to display an address bar display screen. Then, the screen display processing unit 303 displays the content display screen and the address bar display screen on the operation display unit 211 via the operation unit output I/F 205.

It should be noted that the sequential process described above is similar to the process in the steps S407 to S409 in FIG. 4B referred to in the description of the first embodiment.

After the process in the step S613, a screen on which the content display region 510 and the address bar display region 511 are displayed is displayed on the operation display unit 211 as shown in FIG. 5B.

As described above, in the information processing apparatus according to the second embodiment, an address bar is displayed on the screen of the operation display unit 211. Thus, the user can know a URL address of a Web server from which contents being currently displayed in the content display region 510 are obtained.

Thus, the user can know whether or not the user accesses an unintended Web server when the access restriction is not imposed on the Web server. As a result, the user can view contents with a sense of security.

Next, when it is determined in the step S604 in FIG. 6A that the value of the access restriction setting switch 531 is valid (YES in the step S604), the process proceeds to step S605. Namely, in this case, it is determined that access restriction using a URL address is not imposed on a Web server.

Then, in the step S605, the Web browser 300 determines whether or not the URL address to which access is instructed matches a URL address in the access-permitted address data 308.

When it is determined that the URL address to which access is instructed does not match a URL address in the access-permitted address data 308 (NO in the step S605), it is determined that unauthorized access is being made, and the process is terminated without doing anything.

When it is determined that the URL address to which access is instructed by the user matches a URL address in the access-permitted address data 308 (YES in the step S605), the process proceeds to step S606.

Then, in the step S606, the content obtainment unit 301 obtains contents from the Web server at the URL address to which access is instructed by the user.

Further, the Web browser 300 instructs the content analysis unit 302 to analyze the contents obtained in the step S606 and create a content display screen. Also, the Web browser 300 instructs the screen display processing unit 303 to display the created content display screen (step S607).

The screen display processing unit 303 displays the content display screen on the operation display unit 211 via the operation unit output I/F 205.

It should be noted that the sequential process in the steps S607 to S608 is the same as the process in the steps S411 to S412 in the first embodiment described above.

After the process in the step S608, a Web browser screen as shown in FIG. 5C is displayed on the operation display unit 211. On this screen, only the content display region 520 is displayed, and an address bar is not displayed.

Moreover, when access restriction is imposed, only contents from a Web server to which access is permitted are displayed.

In short, the Web browser 300 has an address display control unit that, when the obtainable address information storage unit is configured to permit access to all addresses, provides control to display a screen created by the address drawing unit on the display unit, and when access to only specific addresses is permitted, provides control so as not to display a screen created by the address drawing unit on the display unit.

Thus, because in the information processing apparatus according to the second embodiment, there is no possibility that contents from a Web server unintended by the user will be displayed, the user does not feel a sense of uncertainty even if an address bar is not displayed. Further, in the information processing apparatus according to the second embodiment, when access restriction is imposed, the content display region 520 is widely displayed without giving the user a sense of insecurity, and thus visibility and operability in content display can be enhanced.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-270304 filed Nov. 27, 2009, which is hereby incorporated by reference herein in its entirety.

What is claimed is:

1. An information processing apparatus that operates in an access restriction mode or in an access permission mode, the information processing apparatus comprising:
   a display device;
   a storage device; and
   a processor programmed to provide:
   a storing task of storing in the storage device at least one access-permitted uniform resource locator (URL);
   a setting task that selectively sets one of the access restriction mode or the access permission mode;
   an input task that inputs a URL;
   a determination task that determines, when the access restriction mode has been set, whether the input URL matches one of the stored at least one access-permitted URL;
   an access task that accesses data corresponding to the input URL,
      wherein, when the access permission mode has been set, the access task accesses the data regardless of the input URL, and
      wherein, when the access restriction mode has been set, the access task accesses the data when the determination task determines that the input URL matches one of the stored at least one access-permitted URL;
   a display task that displays the data on the display device; and
   a display control task that:
      when the access restriction mode has been set and the determination task determines that the input URL matches one of the stored at least one access-permitted URL, restricts displaying of a URL address display region and allows displaying of the accessed data on the display device; and
      when the access permission mode has been set, allows displaying of the URL address display region together with the accessed data on the display device regardless of the input URL address.

2. The information processing apparatus according to claim 1, wherein the URL display region is an address bar.

3. The information processing apparatus according to claim 1, wherein the data is HTML data.

4. The information processing apparatus according to claim 1, wherein the input task inputs the URL based on an access instruction contained in a screen displayed on the display device.

5. A method of controlling an information processing apparatus that operates in an access restriction mode or in an access permission mode, and has a display device and a storage device, the method comprising:
   a storing step of storing in the storage device at least one access-permitted uniform resource locator (URL);
   a setting step of selectively setting one of the access restriction mode or the access permission mode;
   an input step of inputting a URL;
   a determination step of determining, when the access restriction mode has been set, whether the input URL matches one of the stored at least one access-permitted URL;
   an access step of accessing data corresponding to the input URL,
      wherein, when the access permission mode has been set, the access step accesses the data regardless of the input URL, and
      wherein, when the access restriction mode has been set, the access step accesses the data when the determination task determines that the input URL matches one of the stored at least one access-permitted URL;
   a display step of displaying the data on the display device; and
   display control steps of:
      when the access restriction mode has been set and the determination step determines that the input URL matches one of the stored at least one access-permitted URL, restricting displaying of a URL address display region and allows displaying of the accessed data on the display device; and
      when the access permission mode has been set, allowing displaying of the URL address display region together with the accessed data on the display device regardless of the input URL address.

6. A non-transitory computer-readable storage medium storing a program executable by a processor of an information processing apparatus that operates in an access restriction mode or in an access permission mode, and has a display device and a storage device, to execute a control method of controlling the information processing apparatus, the method comprising:
   a storing step of storing in the storage device at least one access-permitted uniform resource locator (URL);
   a setting step of selectively setting one of the access restriction mode or the access permission mode;
   an input step of inputting a URL;
   a determination step of determining, when the access restriction mode has been set, whether the input URL matches one of the stored at least one access-permitted URL;
   an access step of accessing data corresponding to the input URL,
      wherein, when the access permission mode has been set, the access step accesses the data regardless of the input URL, and
      wherein, when the access restriction mode has been set, the access step accesses the data when the determination task determines that the input URL matches one of the stored at least one access-permitted URL;
   a display step of displaying the data on the display device; and
   display control steps of:
      when the access restriction mode has been set and the determination step determines that the input URL matches one of the stored at least one access-permitted URL, restricting displaying of a URL address display region and allows displaying of the accessed data on the display device; and
      when the access permission mode has been set, allowing displaying of the URL address display region together with the accessed data on the display device regardless of the input URL address.

* * * * *